(12) United States Patent
Hayakawa et al.

(10) Patent No.: US 11,535,502 B2
(45) Date of Patent: Dec. 27, 2022

(54) TROUBLE RECOVERING METHOD OF ASEPTIC FILLING MACHINE AND ASEPTIC FILLING MACHINE

(71) Applicant: Dai Nippon Printing Co., Ltd., Tokyo (JP)

(72) Inventors: Atsushi Hayakawa, Tokyo (JP); Shuta Ito, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 507 days.

(21) Appl. No.: 16/479,716

(22) PCT Filed: Feb. 20, 2018

(86) PCT No.: PCT/JP2018/005846
§ 371 (c)(1),
(2) Date: Jul. 22, 2019

(87) PCT Pub. No.: WO2018/151306
PCT Pub. Date: Aug. 23, 2018

(65) Prior Publication Data
US 2021/0403304 A1 Dec. 30, 2021

(30) Foreign Application Priority Data
Feb. 20, 2017 (JP) .............................. JP2017-029251

(51) Int. Cl.
*B67C 3/00* (2006.01)
*B67C 7/00* (2006.01)
(Continued)

(52) U.S. Cl.
CPC .......... *B67C 3/007* (2013.01); *B29C 49/4273* (2013.01); *B29C 49/46* (2013.01);
(Continued)

(58) Field of Classification Search
CPC ........... B67C 3/007; B67C 3/28; B67C 3/424; B67C 7/00; B67C 7/002; B67C 7/004;
(Continued)

(56) References Cited

U.S. PATENT DOCUMENTS 9,022,079 B2 * 5/2015 Py .......................... B65B 55/025
141/11
2009/0013645 A1 * 1/2009 Mastio ..................... A61L 2/087
53/425

(Continued)

FOREIGN PATENT DOCUMENTS

JP   H03-014433 A1   1/1991
JP   H04-201823 A1   7/1992
(Continued)

OTHER PUBLICATIONS

International Search Report and Written Opinion (Application No. PCT/JP2018/005846) dated May 15, 2018.

*Primary Examiner* — Andrew M Tecco
*Assistant Examiner* — Jacob A Smith
(74) *Attorney, Agent, or Firm* — Burr & Brown, PLLC

(57) ABSTRACT

A trouble recovering method of an aseptic filling machine and an aseptic filling machine which can resume operation at an early stage if a trouble occurs in any of portions during an operation of the aseptic filling machine are provided.
A door of a chamber in which the trouble occurred is opened while a pressure in the chamber other than the chamber in which the trouble occurred is kept positive, the trouble is removed and then, the door is closed, an inside of the chamber in which the trouble occurred is cleaned as necessary, the inside of the chamber is sterilized and then, the operation of the aseptic filling machine is resumed.

14 Claims, 7 Drawing Sheets

(51) Int. Cl.
  *B67C 3/28* (2006.01)
  *B29C 49/42* (2006.01)
  *B29C 49/46* (2006.01)
  *B29K 101/12* (2006.01)
  *B29L 31/00* (2006.01)
  *B67C 3/22* (2006.01)

(52) U.S. Cl.
  CPC .............. *B67C 3/28* (2013.01); *B67C 7/0046* (2013.01); *B67C 7/0073* (2013.01); *B29C 2049/4697* (2013.01); *B29K 2101/12* (2013.01); *B29L 2031/7158* (2013.01); *B67C 2003/228* (2013.01); *B67C 2007/006* (2013.01)

(58) Field of Classification Search
  CPC ... B67C 7/0046; B67C 7/0053; B67C 7/0073; B67C 7/008; B67C 2003/227; B67C 2003/228; B67C 2007/006; B29C 49/42
  USPC .................................. 53/282, 425, 426, 471
  See application file for complete search history.

(56) References Cited

U.S. PATENT DOCUMENTS

| | | |
|---|---|---|
| 2010/0170867 A1 | 7/2010 | Hayakawa |
| 2011/0094616 A1 | 4/2011 | Hayakawa et al. |
| 2013/0061557 A1* | 3/2013 | Kitano .................... B29C 45/76 53/167 |
| 2016/0263269 A1 | 9/2016 | Hayakawa et al. |
| 2016/0325975 A1* | 11/2016 | Hayakawa ................ B67C 3/24 |

FOREIGN PATENT DOCUMENTS

| | | | |
|---|---|---|---|
| JP | H11-208782 A1 | 8/1999 | |
| JP | 2003-072718 A1 | 3/2003 | |
| JP | 2010-189023 A1 | 9/2010 | |
| JP | 2014-065301 A1 | 4/2014 | |
| JP | 2014065301 A * | 4/2014 | ............. B29C 49/36 |
| JP | 2015-116814 A1 | 6/2015 | |
| JP | 2015116814 A * | 6/2015 | ........... A61L 12/086 |
| JP | 2015-120555 A1 | 7/2015 | |
| JP | 2015-129022 A1 | 7/2015 | |
| JP | 2015-155332 A1 | 8/2015 | |
| WO | 2011/148953 A1 | 12/2011 | |

* cited by examiner

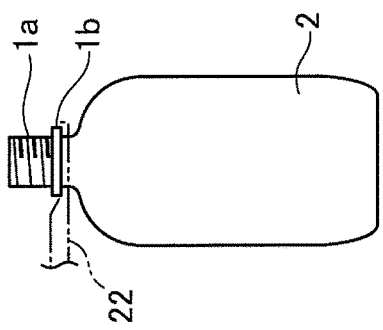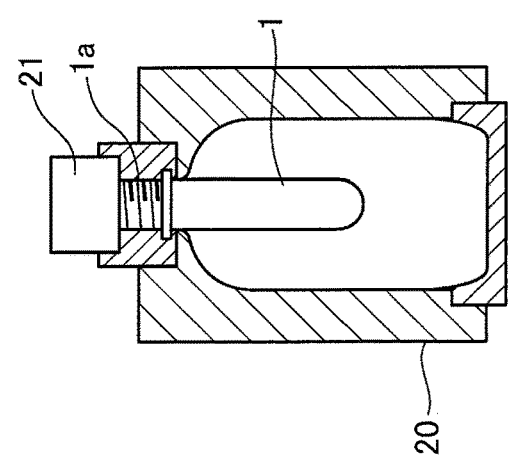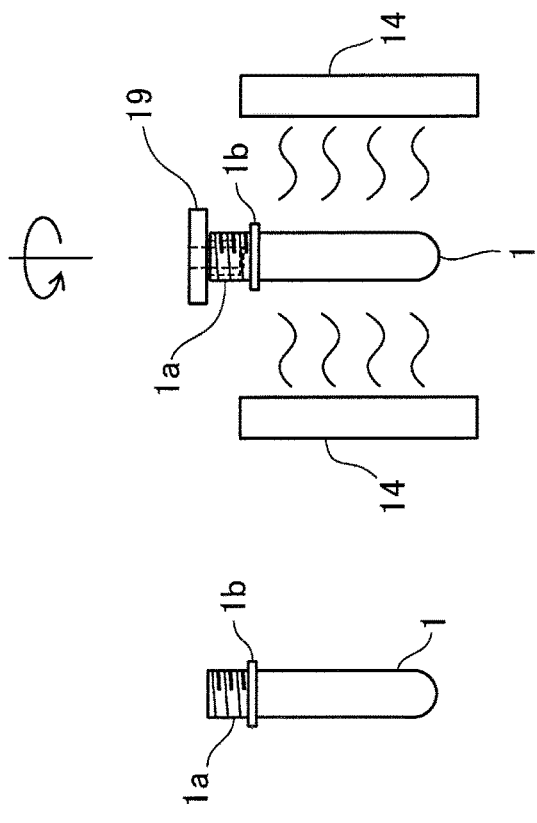

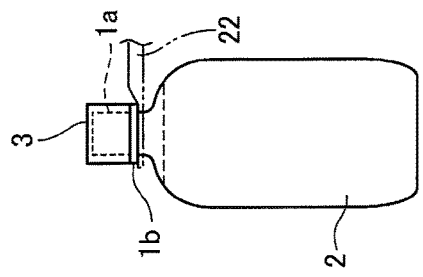
FIG.3(H) SEALING
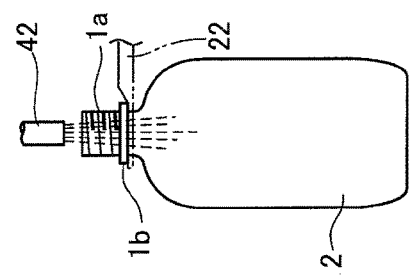
FIG.3(G) FILLING
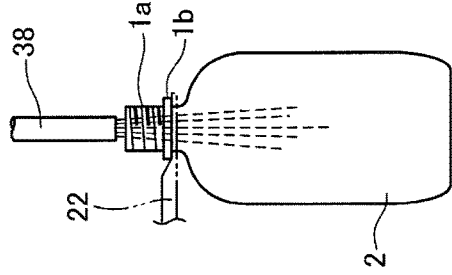
FIG.3(F-1) AIR-RINSING
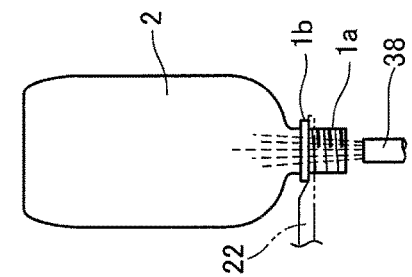
FIG.3(F-2) AIR-RINSING
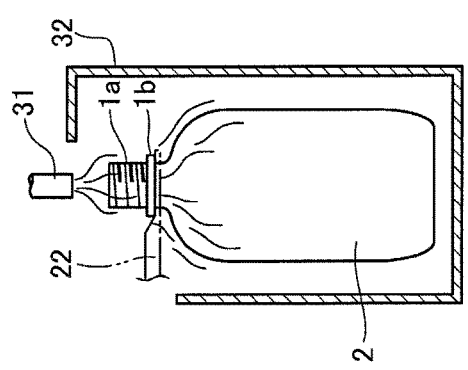
FIG.3(E-1) BLASTING STERILIZER GAS
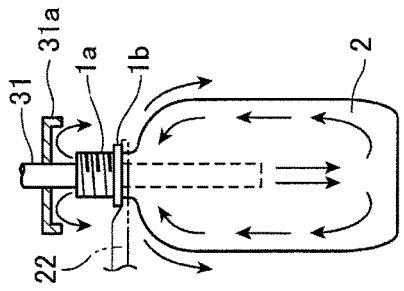
FIG.3(E-2) BLASTING STERILIZER GAS

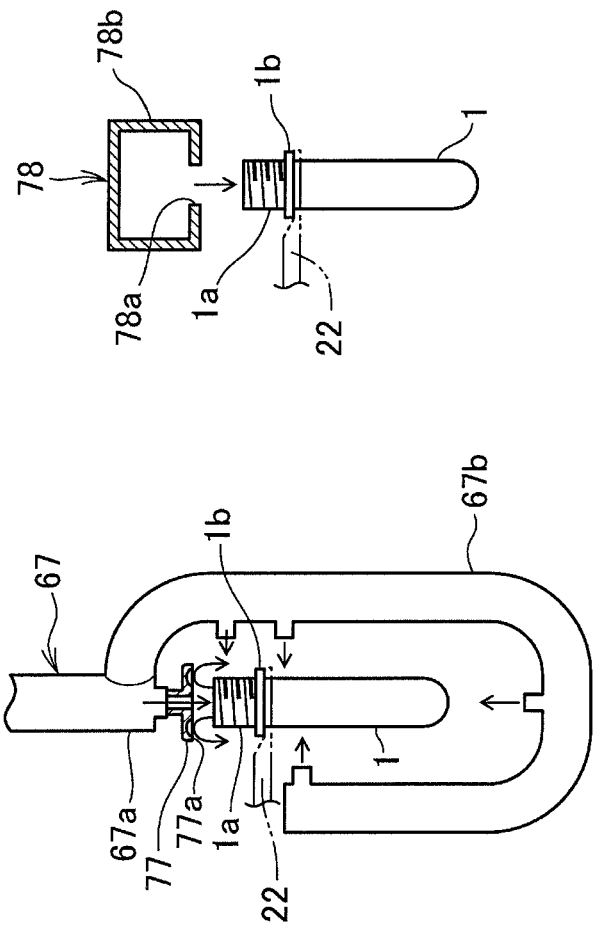

TROUBLE RECOVERING METHOD OF ASEPTIC FILLING MACHINE AND ASEPTIC FILLING MACHINE

BACKGROUND OF THE INVENTION

1. Field of the Invention

The present invention relates to a trouble recovering method of an aseptic filling machine and an aseptic filling machine which can resume operation at an early stage in an aseptic filling machine for sterilizing a container in an aseptic atmosphere, filling a drink or the like which are the contents therein, and manufacturing a sealed product, if a trouble occurs in any of portions of the aseptic filling machine, and an operation of the aseptic filling machine is stopped.

2. Description of Related Art

An apparatus for sterilizing containers has already been proposed in which, while a preform is being caused to continuously travel, the preform is introduced into a heating portion, heated within the heating portion to a temperature for molding a preform container, a gaseous matter is then blown into the heated preform to mold the preform into a bottle, and the bottle is then sterilized, filled with sterilized content into the sterilized bottle, and the bottle filled with the contents is sealed with a sterilized cap (Patent Literature 1). In this kind of apparatus, an inspecting portion that inspects the molded bottle, a sterilizing portion that sterilizes the bottle which is determined to be proper by the inspection, an air-rinsing portion that performs air-rinsing of the sterilized bottle, a filling portion that fills the contents into the air-rinsed bottle, a sealing portion that seals the bottle filled with the contents, and a discharge portion that discharges the sealed bottle are shielded by chambers. A proper pressure is kept in each of the chambers by supply of an aseptic air into the chamber and discharge of the air in the chamber as necessary, and an aseptic condition of the filling machine is maintained.

An apparatus for sterilizing containers has also been proposed that sterilizes a preform, molds the sterilized preform into a bottle, fills sterilized content into the molded bottle, and seals the bottle filled with the contents with a sterilized cap (Patent Literature 2). In this case also, a sterilizing portion that sterilizes a preform, a heating portion that heats the preform to a molding temperature, a molding portion that molds the heated preform into a bottle, an inspecting portion that inspects the molded bottle, a filling portion that fills contents in the bottle determined to be proper by inspection, a sealing portion that seals the bottle filled with the contents, and a discharge portion that discharges the sealed bottle are shielded by chambers. A proper pressure is kept in each of the chambers by supply of an aseptic air into the chamber and discharge of the air in the chamber as necessary, and an aseptic condition of the filling machine is maintained.

The proper pressure in each of the chambers is 40 Pa in the filling portion chamber as the highest pressure, while the pressure in the sterilizing portion chamber is 10 Pa, and with the pressure in the filling portion chamber as the highest pressure, the pressure in each of the chambers is lowered as it goes to an upstream and a downstream in the case of the cited document 1. It is considered that, if such proper pressure is held in each of the chambers, it is not necessary to provide a supply device or an exhaust apparatus of an aseptic air in all the chambers. For example, if the air in the filling portion chamber flows into the sealing portion chamber, and the pressure in the sealing portion chamber is kept proper, the aseptic air supplying apparatus does not have to be provided in the sealing portion chamber. Actually, there is an example that a chamber that shields the sealing portion is not provided but the filling portion and the sealing portion are provided in the same chamber.

In the aseptic filling machine, an inside of the chamber that shields each portion including the sterilizing portion on the downstream of the sterilizing portion is sterilized before an operation. In the filling portion and after in which the content is handled, the content diffused in the chamber is cleaned and the inside of the chamber is sterilized. For cleaning and sterilization of the inside of the chamber, a method of introducing a sterilizer into the chamber or of spraying an aseptic water is proposed (Patent Literature 3, Patent Literature 4). Since the sterilizing portion and the air-rinsing portion in Patent Literature 1 and the heating portion, the molding portion, and the inspecting portion in Patent Literature 2 are located on the upstream of the filling portion, they do not necessarily have to be cleaned. After such cleaning or sterilization is performed, the aseptic filling machine is operated, and the pressure in each chamber is kept at a proper positive pressure by the aseptic air during the operation.

If a trouble occurs in any portion during the operation of the aseptic filling machine, the operation of the aseptic filling machine needs to be stopped, and the chamber including the portion where the trouble occurred needs to be opened in order to remove a cause for the trouble, and opening of a door of the chamber in which the trouble occurs, the aseptic condition of the entire aseptic filling machine is lost. In order to resume the operation of the aseptic filling machine after the cause for the trouble is removed, required cleaning and sterilization need to be performed for all the chambers required to maintain aseptic condition of the aseptic filling machine.

CITATION LIST

Patent Literature

Patent Literature 1: Japanese Patent Laid-Open No. 2010-189023
Patent Literature 2: Japanese Patent Laid-Open No. 2015-116814
Patent Literature 3: Japanese Patent Laid-Open No. H11-208782
Patent Literature 4: Japanese Patent Laid-Open No. 2015-120555

SUMMARY OF THE INVENTION

Technical Problem

The available types of aseptic filling machines for bottles include a type in which a preform is supplied and molded into a bottle, after which the bottle is sterilized, and content is filled into the bottle and the bottle is then sealed in an aseptic atmosphere, and a type in which a preform is supplied, the preform is sterilized, and then, in an aseptic atmosphere, content is filled into and sealed in a bottle obtained by molding the sterilized preform. In each of these two types of aseptic filling machines, an aseptic condition of the aseptic filling machine is maintained by starting an operation of the aseptic filling machine after required cleaning or sterilization is performed for insides of chambers that shield a heating portion, a molding portion, an inspecting portion, a sterilizing portion, an air-rinsing portion, a filling portion, a sealing portion and the like so as to keep a pressure in each of the chambers proper by an aseptic air. In such aseptic filling machine, if a trouble occurs in any of the portions and the operation of the aseptic filling machine is resumed after the trouble is removed, required cleaning or sterilization need to be performed again in all the portions. Such a cumbersome operation when the operation is to be resumed after occurrence of the trouble in the aseptic filling machine lowers productivity of the aseptic filling machine and wastes energy.

If the operation of the aseptic filling machine can be resumed not by cleaning or sterilizing all the portions but by performing required cleaning and sterilization of only the inside of the chamber in which the trouble occurred, productivity can be improved, and energy consumption can be also kept low.

The present invention has been made to solve the problems described above, and an object of the present invention is to provide a recovering method from a trouble of an aseptic filling machine which can resume an operation of the aseptic filling machine at an early stage and an aseptic filling machine which enables the recovering method by maintaining only the inside of a chamber that shields the portion in which the trouble occurred in a non-aseptic atmosphere and the insides of the other chambers in an aseptic atmosphere if a trouble occurs during an operation of the aseptic filling machine and by cleaning or sterilizing only the inside of the chamber that shields the portion in which the trouble occurred after the cause for the trouble is removed.

Solution to Problem

In a trouble recovering method of an aseptic filling machine according to the present invention, in an aseptic filling machine that fills a sterilized content into a sterilized bottle in an aseptic atmosphere and seals the bottle with a sterilized sealing member, in the aseptic filling machine having a chamber that shields each portion constituting the aseptic filling machine, when a trouble occurs in any of the portions, an operation of the aseptic filling machine is stopped, and in a state where an internal pressure of a trouble non-occurrence chamber which is the chamber that shields the portion in which the trouble does not occur is made a positive pressure by supply of an aseptic air, a door of a trouble occurrence chamber that shields the portion in which the trouble occurred is opened, the trouble is removed and then, the door of the trouble occurrence chamber is closed and the inside of the trouble occurrence chamber is sterilized and then, the operation of the aseptic filling machine is resumed.

Further, in the trouble recovering method of an aseptic filling machine according to the present invention, it is favorable that the portion is any of a preform sterilizing portion that sterilizes a preform, a heating portion that heats the preform to a molding temperature, a molding portion that molds the heated preform into a bottle, a bottle sterilizing portion that sterilizes the molded bottle, a filling portion that fills a content into the molded bottle, a sealing member sterilizing portion that sterilizes a sealing member, a sealing portion that seals the bottle filled with the content, and a discharge portion that discharges the sealed bottle.

Further, in the trouble recovering method of an aseptic filling machine according to the present invention, it is favorable that an opening portion is closed to such a degree that the opening portion is not brought into contact with equipment present at an opening portion of the trouble occurrence chamber and then, the door of the trouble occurrence chamber is opened.

Further, in the trouble recovering method of an aseptic filling machine according to the present invention, it is favorable that the inside of the trouble non-occurrence chamber adjacent to the trouble occurrence chamber is sterilized during a period from start of sterilization of the inside of the trouble occurrence chamber until the operation of the aseptic filling machine is resumed.

Further, in the trouble recovering method of an aseptic filling machine according to the present invention, it is favorable that CIP or SIP of a filling valve is not performed after opening of the door of the trouble occurrence chamber until the operation of the aseptic filling machine is resumed.

Further, in the trouble recovering method of an aseptic filling machine according to the present invention, it is favorable that, if the trouble occurrence chamber is the filling portion chamber that shields the filling portion, a filling nozzle of the filling valve is closed and then, cleaning and sterilization of the inside of the filling portion chamber is performed.

An aseptic filling machine according to the present invention is an aseptic filling machine that fills a sterilized content into a sterilized bottle in an aseptic atmosphere and seals the bottle with a sterilized sealing member, and the aseptic filling machine having a chamber that shields each portion constituting the aseptic filling machine has an opening-portion closing device that, if equipment is present at an opening portion provided in the chamber, closes the opening portion to such a degree that the opening portion is not brought into contact with the equipment, while if the equipment is not present, closes the entire surface of the opening portion.

DETAILED DESCRIPTION OF THE INVENTION

According to the trouble recovering method of an aseptic filling machine and the aseptic filling machine according to the present invention, since the trouble can be removed with only the inside of the chamber that shields the portion in which the trouble occurred being made the non-aseptic atmosphere, time since occurrence of the trouble until the operation of the aseptic filling machine is resumed can be reduced, and since the chamber subjected to cleaning or sterilization for re-operation can be limited only to the chamber in which the trouble occurred, an energy consumption amount can be reduced.

BRIEF DESCRIPTION OF DRAWINGS

FIG. 2 is a view illustrating steps performed by a heating portion and a molding portion of the aseptic filling machine according to the first embodiment of the present invention, in which (A) illustrates a preform supplying step, (B) illustrates a preform heating step, (C) illustrates a blow molding step, and (D) illustrates a bottle extracting step.

FIG. 3 is a view illustrating steps performed by a sterilizing portion and a filling portion of the aseptic filling machine according to the first embodiment of the present invention, in which (E-1) illustrates a sterilizer gas blasting step performed by shielding a bottle by a tunnel, (E-2)

illustrates a sterilizer gas blasting step performed by inserting the sterilizer gas blasting nozzle into a bottle, (F-1) illustrates the air-rinsing step in a state where the bottle is upright, (F-2) illustrates an air-rinsing step in a state where the bottle is inverted, (G) illustrates a filling step, and (H) illustrates a sealing step.

Figure 4:
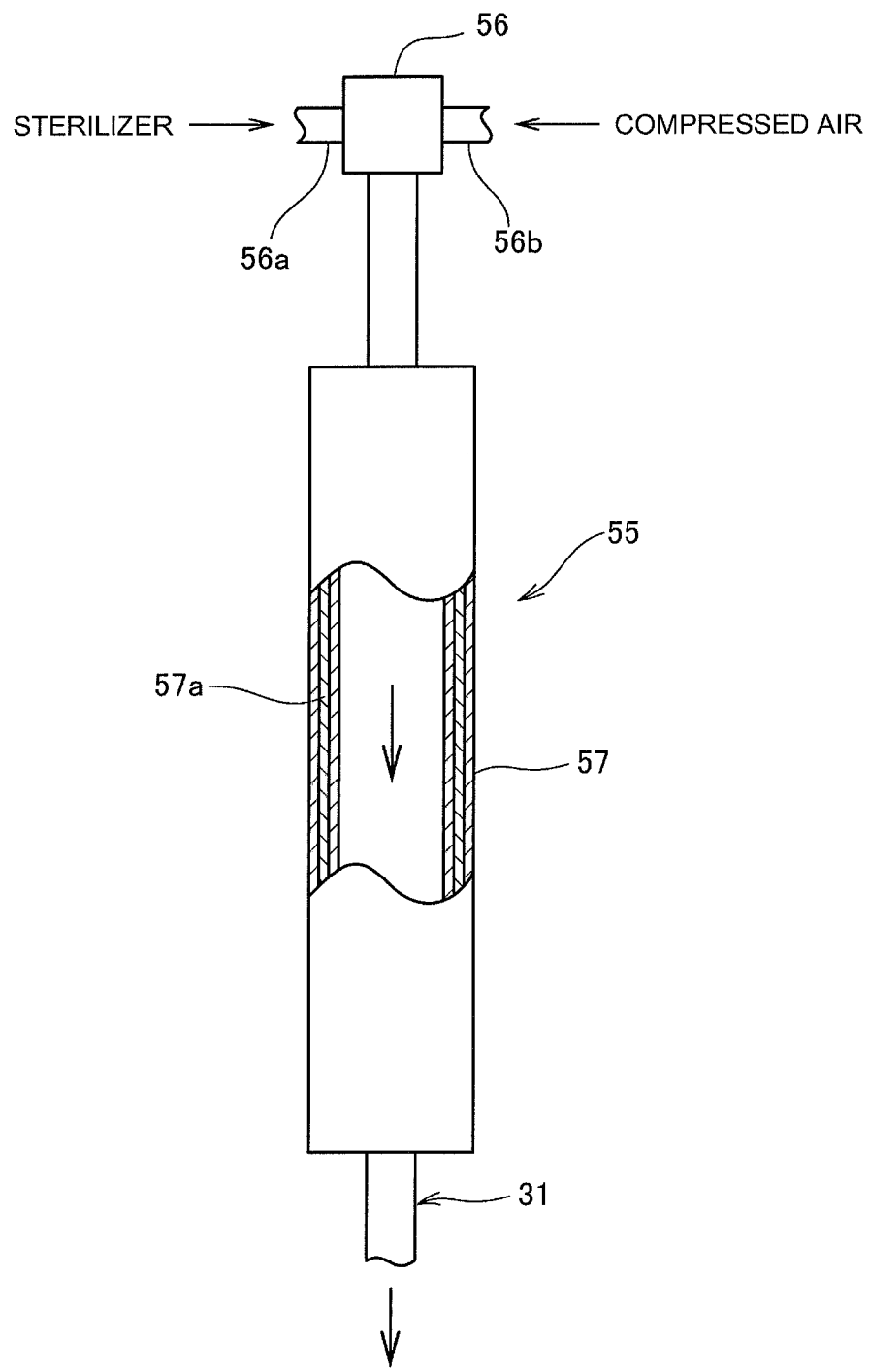

FIG. 4 illustrates a sterilizer gas generator that is incorporated into the aseptic filling machine according to the first embodiment of the present invention.

Figure 5:
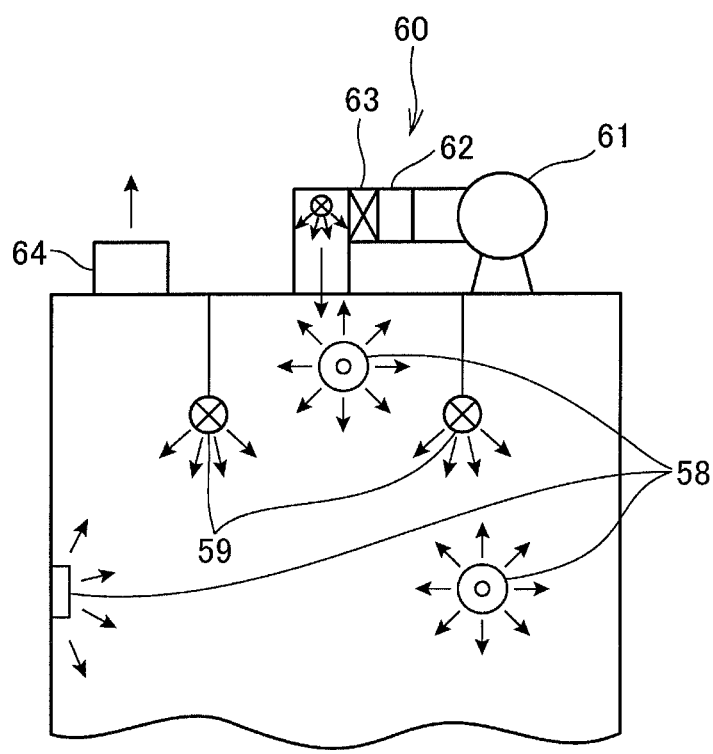

FIG. 5 illustrates a sterilizer spraying nozzle, a liquid spraying nozzle, and an apparatus for supplying an aseptic air that are provided in a chamber of the aseptic filling machine according to the first embodiment of the present invention.

Figure 6:
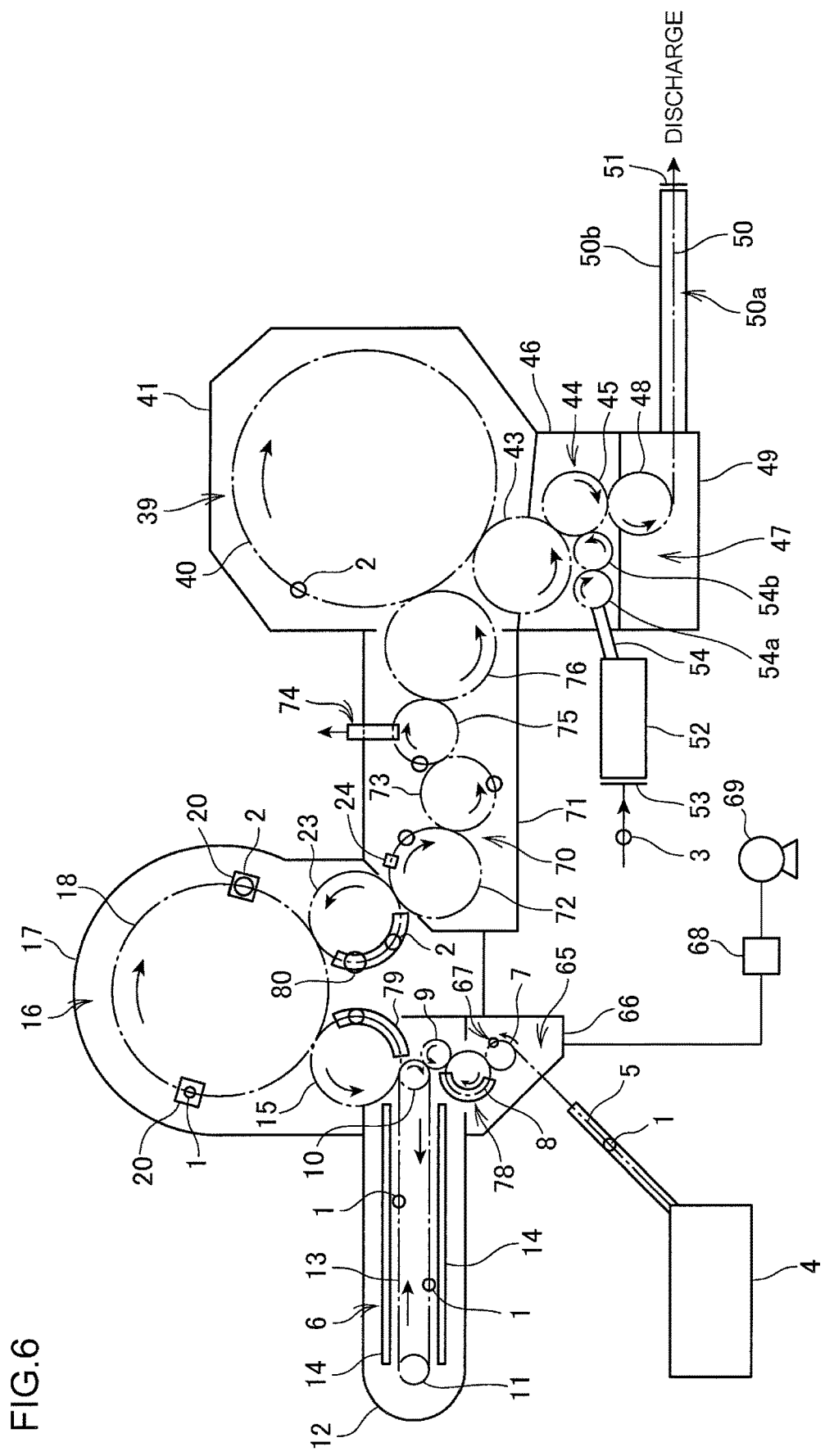

FIG. 6 is a plan view illustrating an outline of an aseptic filling machine according to a second embodiment of the present invention.

FIG. 7 is a view illustrating steps performed by the preform sterilizing portion of the aseptic filling machine according to the second embodiment of the present invention, in which (I) illustrates a sterilizer gas blasting step to a preform, and (J) illustrates an air blasting step to the preform.

DESCRIPTION OF EMBODIMENTS

In the following, forms for implementing the present invention will be described with reference to the drawings.

First Embodiment

Figure 1:
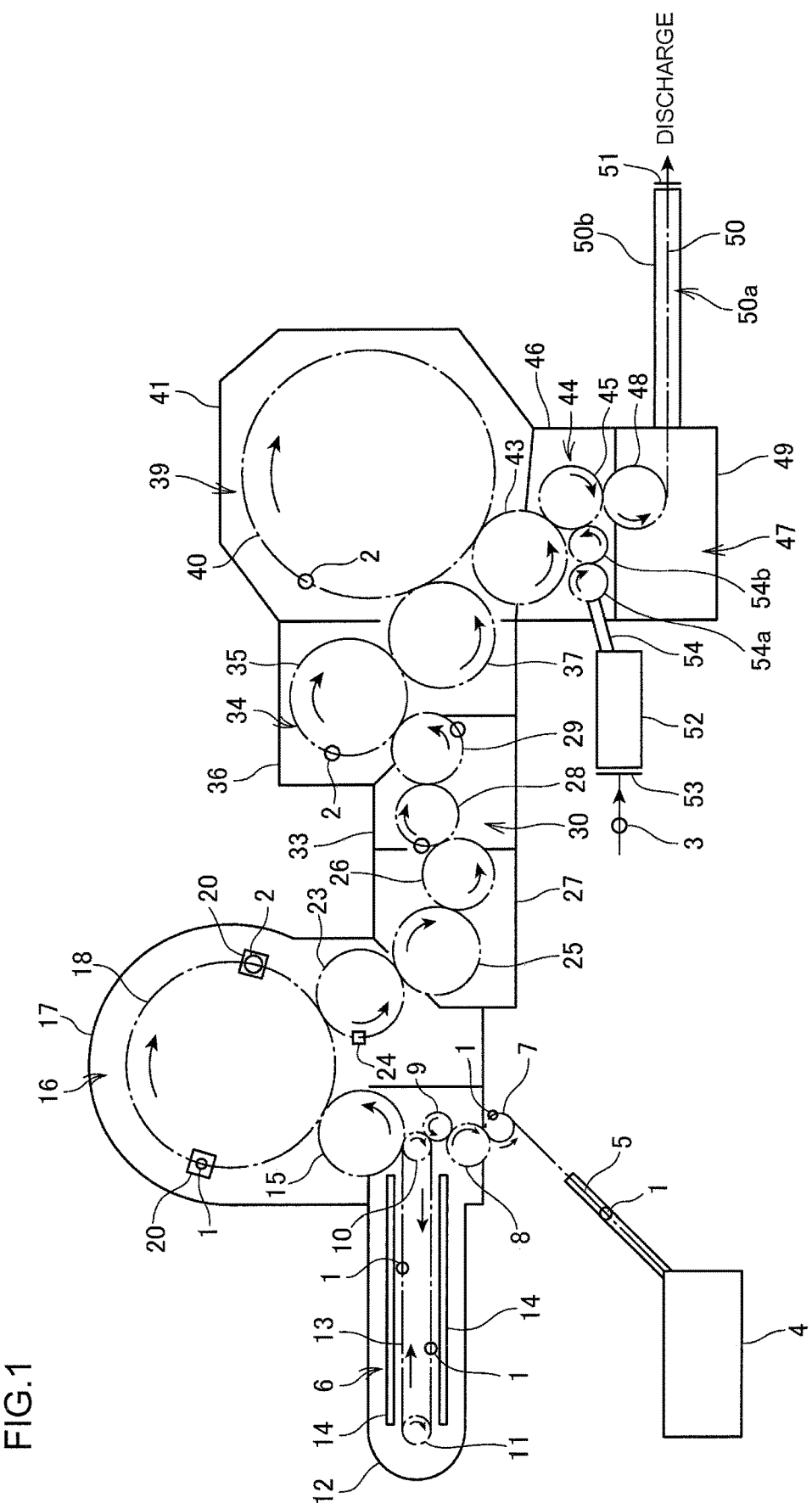
FIG. 1 is a plan view illustrating an outline of an aseptic filling machine according to a first embodiment of the present invention.

FIG. 1 illustrates an aseptic filling machine of a first embodiment according to the present invention. An outline of an aseptic filling machine that sterilizes a bottle and is composed of a heating portion, a molding portion, an inspecting portion, a bottle sterilizing portion, an air-rinsing portion, a filling portion, a sealing portion, and a discharge portion will be described starting from the supply of a preform by way of FIG. 1, and the details of each portion will be described by way of FIG. 2, FIG. 3, FIG. 4, and FIG. 5. According to the first embodiment, even in a case where a trouble occurs in any of the portions of the aseptic filling machine, an operation of the aseptic filling machine can be resumed by cleaning or sterilization of only an inside of a trouble occurrence chamber and thus, time during which the aseptic filling machine is stopped can be shortened, and energy consumption is also small.

Outline of the First Embodiment

As illustrated in FIG. 1, the aseptic filling machine according to the first embodiment includes: a preform supplying apparatus 4 that supplies a preform 1; a heating portion 6 that heats the preform 1 to a temperature at which a bottle 2 is molded; a molding portion 16 that molds the heated preform 1 into the bottle 2; a bottle sterilizing portion 30 that sterilizes the bottle 2 that was molded; an air-rinsing portion 34 that performs air-rinsing of the sterilized bottle 2; a filling portion 39 that fills sterilized content into the bottle 2 that was subjected to air-rinsing; a cap sterilizing portion 52 that sterilizes a cap 3 which is a sealing member, a sealing portion 44 that seals the bottle 2 filled with the content with the sterilized cap 3; a discharge portion 47 that places the sealed bottle 2 on a discharging conveyor 50; and an outlet portion 50a that discharges the bottle 2 into a non-aseptic zone by the discharging conveyor 50. Here, the air-rinsing portion 34 does not have to be provided.

The heating portion 6 is shielded by a heating portion chamber 12, the molding portion 16 is shielded by a molding portion chamber 17, the bottle sterilizing portion 30 is shielded by a bottle sterilizing portion chamber 33, the air-rinsing portion 34 is shielded by an air-rinsing portion chamber 36, the filling portion 39 is shielded by a filling portion chamber 41, the sealing portion 44 is shielded by a sealing portion chamber 46, the discharge portion 47 is shielded by a discharge portion chamber 49, and the outlet portion 50a is shielded by an outlet portion chamber 50b, respectively. An atmosphere shutoff chamber 27 is provided between the molding portion 16 and the bottle sterilizing portion 30 to ensure that gas or mist of a sterilizer or a mixture thereof that is generated at the bottle sterilizing portion 30 does not flow into the molding portion 16. The atmosphere shutoff chamber 27 is evacuated, and therefore the gas or mist of a sterilizer or a mixture thereof that is generated at the bottle sterilizing portion 30 does not flow into the molding portion 16. Here, the heating portion 6 and the molding portion 16 may be shielded by a single chamber. Further, the cap sterilizing portion 52 and the sealing portion 44 may also be shielded by a single chamber. Further, the sealing portion 44 and the discharge portion 47 may also be shielded by a single chamber.

During an operation of the aseptic filling machine, an aseptic air that was sterilized by a sterilizing filter is supplied to the bottle sterilizing portion chamber 33, the air-rinsing portion chamber 36, the filling portion chamber 41, the sealing portion chamber 46, the discharge portion chamber 49, and the outlet portion chamber 50b, and the interior of each of these chambers is maintained at a positive pressure, whereby an aseptic condition of the aseptic filling machine is maintained. The pressure that is maintained at a positive pressure is set so as to be highest in the filling portion chamber 41, and to be progressively lower toward the upstream side, with the pressure being lower in the air-rinsing portion chamber 36 than in the filling portion chamber 41, and further lower in the bottle sterilizing portion chamber 33. Further, the pressure that is maintained at a positive pressure is set so as to be progressively lower toward the downstream side, with the pressure being lower in the sealing portion chamber 46 than in the filling portion chamber 41, and further lower in the discharge portion chamber 49 and in the outlet portion chamber 50b. The pressure inside the atmosphere shutoff chamber 27 is maintained at approximately the same pressure as the atmospheric pressure by evacuation of air. Assuming that the pressure inside the filling portion chamber 41 is 20 to 40 Pa, for example, the pressures in the other chambers are lower than the pressure in the filling portion chamber 41.

If a trouble occurs in a portion of any of the chambers, a door of the chamber needs to be opened, and an inside of the trouble occurrence chamber in which the trouble occurred needs to be made a non-aseptic atmosphere in order to remove the trouble. During the operation of the aseptic filling machine, if the aseptic condition is maintained, the pressure in each of the chambers may be low. However, when the trouble is to be removed, in order to prevent inflow of bacteria or the like from the trouble occurrence chamber in the non-aseptic atmosphere and to maintain the aseptic condition in a trouble non-occurrence chamber which is a chamber in which a trouble did not occur, the pressure in the trouble non-occurrence chamber needs to be kept relatively high. The pressure in the trouble non-occurrence chamber is preferably 30 Pa or more or more preferably 50 Pa or more. By having the pressure at 50 Pa or more, even if the trouble occurrence chamber is in the non-aseptic atmosphere during stop of the aseptic filling machine, the inside of the trouble non-occurrence chamber can be kept in the aseptic atmosphere. Therefore, the bottle sterilizing portion chamber 33, the air-rinsing portion chamber 36, the filling portion chamber 41, the sealing portion chamber 46, the discharge portion chamber 49, and the outlet portion chamber 50b in which the aseptic atmosphere should be maintained during the operation of the aseptic filling machine include an apparatus for supplying an aseptic air which can keep the pressure in the respective chambers preferably at 30 Pa or more or more preferably at 50 Pa or more.

Details of the First Embodiment

First, the preforms 1 illustrated in FIG. 2(A) are conveyed from the preform supplying apparatus 4 shown in FIG. 1 to the heating portion 6 consecutively at a desired speed by a preform supplying conveyor 5.

The preform 1 in this embodiment is a bottomed cylindrical body having a test tube shape and is formed with a mouth portion 1a like that of the bottle 2 shown in FIG. 2(D) when performing initial molding thereof. A male thread is formed at the mouth portion 1a concurrently with molding of the preform 1. Further, a support ring 1b for conveying is formed below the mouth portion 1a in the preform 1. The preform 1 or the bottle 2 is gripped by a gripper 22 through the support ring 1b, and travels through the inside of the aseptic filling machine. The preform 1 is molded by injection molding, compression molding or the like. The material of the preform 1 is composed of a thermoplastic resin such as polyethylene terephthalate, polyethylene naphthalate, polypropylene or polyethylene, and may be a resin simple substance or a mixture of these thermoplastic resins, and may include recycled thermoplastic resin. Further, to impart a barrier property, a thermoplastic resin such as polyamide having an aromatic amine such as an ethylene-vinyl alcohol-copolymer or a metaxylylene diamine as a monomer may be included as a layer or as a mixture.

The preform 1 that was supplied to the heating portion 6 is conveyed by wheels 7 and 8 on which a large number of the grippers 22 are provided at regular intervals, and thus reaches a heating portion conveyance wheel 9. At such time, as shown in FIG. 2(B), the preform 1 is released from the gripper 22, and a spindle 19 is inserted into the mouth portion 1a of the preform 1, and the preform 1 is conveyed.

As illustrated in FIG. 2(B), the preform 1 is heated to a temperature suitable for subsequent blow molding, by an infrared heater 14 or other heating device. A suitable temperature is within the range of 90 to 130° C.

Note that, the temperature of the mouth portion 1a of the preform 1 is suppressed to a temperature of not more than 70° C. to prevent deformation and the like.

As illustrated in FIG. 2(B), the spindle 19 is inserted into the mouth portion 1a of the preform 1, and the preform 1 is heated by the infrared heater 14 and conveyed by an endless chain 13 while rotating. The spindles 19 are provided at fixed intervals on an endless chain 13. The endless chain 13 rotates by means of pulleys 10 and 11. It is also possible to convey the preform 1 while rotating in an inverted state by inserting a mandrel in place of the spindle 19 into the preform 1.

The heated preform 1 is released from the spindle 19 and gripped by the gripper 22, and is conveyed to a mold wheel 18 of the molding portion 16 via a wheel 15. As illustrated in FIG. 2(C), the preform 1 is blow-molded into the bottle 2 by means of a mold 20 provided on the mold wheel 18. The mold 20 and a blow nozzle 21 are arranged at a plurality of places around the mold wheel 18, and swivel at a constant speed around the mold wheel 18 together with the rotation of the mold wheel 18. When the heated preform 1 arrives, the mold 20 clamps the preform 1. Next, the blow nozzle 21 is paired with the preform 1, an extension rod (not shown) is guided to a hole provided in the blow nozzle 21 and inserted into the preform 1, and the preform 1 is extended lengthwise, and gaseous matter such as air is blown into the preform 1 from the blow nozzle 21 at the same time, and the preform 1 is extended crosswise, and thus the bottle 2 is molded within the mold 20. As illustrated in FIG. 2(D), the molded bottle 2 is taken out from the mold 20, and the support ring 1b is gripped by the gripper 22 provided on an inspection wheel 23 to thereby transfer the molded bottle 2 to the inspection wheel 23.

The molded bottle 2 is subjected to an inspection by an inspection machine 24 provided at the periphery of the inspection wheel 23 to thereby detect the bottle temperature and inspect the bottle body portion, the support ring, the top surface of the bottle mouth portion, the bottle base and the like. If it is determined that there is an abnormality, the molded bottle 2 is discharged to outside of the aseptic filling machine by an unshown discharging apparatus. The inspection of the bottle is performed in the molding portion chamber 17, but inspection may be performed in an inspecting portion shielded by a separate chamber.

Detection of the bottle temperature is performed by detecting the surface temperature of the bottle 2 to determine the suitability of the bottle 2. The temperature sensor is, for example, an infrared radiation thermometer (infrared radiation camera), and it is also possible to use another kind of thermometer. It is necessary that residual heat from the time when the bottle was molded remains in the bottle 2 in order to properly sterilize the bottle 2, and it is desirable that the temperature detected by the temperature sensor is 50° C. or more.

Further, the bottle body portion, the support ring, the top surface of the bottle mouth portion and the bottle base are photographed by a camera, and the state of each of these locations is examined. The photographed images are processed by an image processing apparatus to determine the presence/absence of abnormalities such as flaws, contaminants, deformation and discoloring. If an abnormality of the bottle 2 exceeds an allowable range, the bottle 2 is determined to be abnormal.

The bottles 2 which are not determined to be abnormal in the inspection by the inspection machine 24 are conveyed to the bottle sterilizing portion 30 via wheels 25 and 26 in the atmosphere shutoff chamber 27 which is provided between the molding portion 16 and the bottle sterilizing portion 30 to ensure that gas or mist of sterilizer of a mixture thereof that is generated in the bottle sterilizing portion 30 does not flow into the molding portion 16.

The bottle 2 that was conveyed to the bottle sterilizing portion 30 is sterilized at a wheel 28. A sterilizer gas blasting step to the bottle 2 for sterilizing the bottle 2 is illustrated in FIG. 3(E-1). A sterilizer gas blasting nozzle 31 is provided for blasting sterilizer gas at the bottle 2. The sterilizer gas blasting nozzle 31 is fixed so that a nozzle hole in the tip thereof can directly face the opening of the mouth portion 1a of the bottle 2 that travels directly below the sterilizer gas blasting nozzle 31. Further, as necessary, as illustrated in FIG. 3(E-1), a sterilizer gas blasting tunnel 32 is provided along the travelling path of the bottle 2 below the sterilizer gas blasting nozzle 31. One sterilizer gas blasting nozzle 31 or a plurality of the sterilizer gas blasting nozzles 31 may be provided. The gas of a sterilizer that is blasted at the bottle 2 flows into the interior of the bottle 2 and sterilizes the inner surface of the bottle 2. At this time, because the bottle 2 travels through the inside of the sterilizer gas blasting tunnel 32, gas or mist of the sterilizer or a mixture thereof also flows along the outer surface of the bottle 2 and sterilizes the outer surface of the bottle 2.

Further, as illustrated in FIG. 3(E-2), the sterilizer gas blasting nozzle 31 is made to follow the conveyance of the bottle 2, the sterilizer gas blasting nozzle 31 is inserted into the bottle 2, and the gas or mist of the sterilizer or the mixture thereof may be directly blasted to the inner surface of the bottle 2. The sterilizer gas or mist or the mixture thereof overflowing from the bottle 2 collides against a guide member 31a provided by surrounding the sterilizer gas blasting nozzle 31, flows to the outer surface of the bottle 2 and is brought into contact with the outer surface of the bottle 2. On the guide member 31a, a flange portion coaxial with the nozzle 31 and an annular wall portion protruding to an outer periphery from the flange portion are provided.

The gas or mist of the sterilizer or a mixture thereof is a sterilizer that is gasified by a sterilizer gas generator 55 illustrated in FIG. 4 or is mist that is formed when gasified sterilizer condenses or a mixture thereof. The sterilizer gas generator 55 includes a sterilizer supply portion 56 that is a twin-fluid spray nozzle that supplies a sterilizer in the form of drops, and a vaporizing portion 57 that vaporizes the sterilizer that is supplied from the sterilizer supply portion 56 by heating the sterilizer to a temperature equal to or lower than the decomposition temperature thereof. The sterilizer supply portion 56 is configured to receive the sterilizer and compressed air that are introduced from a sterilizer supply path 56a and a compressed air supply path 56b, respectively, and to spray the sterilizer into the vaporizing portion 57. The vaporizing portion 57 is a pipe that incorporates a heater 57a disposed between inner and outer walls thereof, and heats and vaporizes the sterilizer sprayed into the pipe. The gas of the vaporized sterilizer is ejected to the outside of the vaporizing portion 57 from the sterilizer gas blasting nozzle 31. A configuration may also be adopted in which the vaporizing portion 57 is heated by dielectric heating instead of the heater 57a.

As the operating condition of the sterilizer supply portion 56, for example, the pressure of the compressed air is adjusted within the range of 0.05 Mpa to 0.6 Mpa. Further, the sterilizer may be allowed to fall by gravity or pressure may be applied thereto, and the amount supplied can be freely set. For example, the sterilizer is supplied to the sterilizer supply path 56a in an amount within a range of 1 g/rain to 100 g/min. Furthermore, sprayed sterilizer is vaporized by heating the inner surface of the vaporizing portion 57 within a range from 140° C. to 450° C.

The gas of the sterilizer is blasted from the sterilizer gas blasting nozzle 31 into the bottle 2 as illustrated in FIG. 3(E). Although the blasting amount of the gas or mist of the sterilizer or the mixture thereof is arbitrarily set, the blasting amount is determined by the amount of sterilizer supplied to the sterilizer gas generator 55 and the blasting time period. A plurality of the sterilizer gas generators 55 may be provided. The blasting amount also varies depending on the size of the bottle 2.

The sterilizer preferably contains at least hydrogen peroxide. An appropriate range of the content thereof is from 0.5% by mass to 65% by mass. If the content is lower than 0.5% by mass, the sterilizing power may be insufficient in some cases, while if the content is higher than 65% by mass, the sterilizer will be difficult to handle from the viewpoint of safety. A further preferable range is from 0.5% by mass to 40% by mass. When the content is equal to or lower than 40% by mass, it is easier to handle the sterilizer, and the residual amount of sterilizer into the bottle 2 after sterilization can be reduced since the concentration is low.

When a hydrogen peroxide solution is adopted as the sterilizer, the blasting amount of gas of the hydrogen peroxide solution is as follows. The amount of hydrogen peroxide adhering to the inner surface of the bottle 2 that is produced by the gas of the hydrogen peroxide solution that is blasted at the inner surface of the bottle 2 from the sterilizer gas blasting nozzle 31 is preferably within a range of 30 μL/bottle to 150 μL/bottle as the amount of a hydrogen peroxide solution containing 35% by mass of hydrogen peroxide, and more preferably is within a range of 50 μL/bottle to 100 μL/bottle. Further, the hydrogen peroxide concentration of the gas of the hydrogen peroxide solution that is blasted into the bottle 2 is preferably within a range of 2 mg/L to 20 mg/L, and more preferably is within a range of 5 mg/L to 10 mg/L.

Although the sterilizer contains water, the sterilizer may contain one or more of alcohols such as methyl alcohol, ethyl alcohol, isopropyl alcohol, n-propyl alcohol and butyl alcohol, ketones such as acetone, methyl ethyl ketone and acetylacetone, and glycol ether and the like.

The sterilizer may further contain an additive agent such as organic acids including peracetic acid, acetic acid and the like, chlorine compounds including sodium hypochlorite and the like, a compound having a sterilizing effect such as ozone, a cationic surface active agent, a non-ionic surface active agent and a phosphate compound.

As illustrated in FIG. 1, the bottle 2 that was sterilized at the bottle sterilizing portion 30 is conveyed via a wheel 29 to the air-rinsing portion 34. At an air-rinsing wheel 35 illustrated in FIG. 1, aseptic air is blasted into the bottle 2 in the upright state by an air-rinsing nozzle 38 as illustrated in FIG. 3(F-1). The aseptic air may be at ordinary temperature, but is preferably heated. The aseptic air ejects the sterilizer remaining inside the bottle 2, and decomposes the remaining sterilizer to further enhance the sterilizing effect, and thus also has an effect of eliminating contaminants in a case where contaminants remain inside the bottle 2. Further, the aseptic air may be blasted into the bottle 2 in inverted state as illustrated in FIG. 3 (F-2). In this case, it is more effective for removal of contaminants than the upright state. Further, similarly to the sterilizer gas blasting nozzle 31 in FIG. (E-2), by providing the guide member surrounding the air-rinsing nozzle 38, the aseptic air led into the bottle 2 and overflowing from the mouth portion 1a collides against the guide member and rises also an outer peripheral portion of the mouth portion 1a, the temperature at the outer peripheral portion of the mouth portion 1a rinses, and the sterilizing effect on the outer peripheral portion of the mouth portion 1a is improved.

A configuration may also be adopted in which the air-rinsing nozzle 38 is capable of performing vertical motion, and blasts aseptic air inside the bottle 2. Further, a configuration may be adopted in which aseptic water, and not aseptic air, is introduced into the inside of the bottle 2 to rinse the inside of the bottle 2. A configuration may also be adopted in which aseptic air and aseptic water are used in combination to rinse the bottle 2.

The bottle 2 that was subjected to air-rinsing at the air-rinsing portion 34 is conveyed to the filling portion 39 via a wheel 37 as illustrated in FIG. 1. In the filling portion 39, at a filling wheel 40 illustrated in FIG. 1, content is filled into the bottle 2 by a filling nozzle 42 in the manner shown by a filling step illustrated in FIG. 3(G). The content is sterilized beforehand. A predetermined amount of the content such as a drink is filled into the bottle 2 by the filling nozzle 42 that travels in synchronization with the bottle 2.

The bottle 2 into which content was filled is conveyed to the sealing portion 44 via a wheel 43 illustrated in FIG. 1. At a sealing wheel 45 provided in the sealing portion 44, in the manner shown in a sealing step illustrated in FIG. 3(H), a cap 3 that was sterilized by the cap sterilizing portion 52 which is the sealing member is supplied to the sealing wheel 45 via the cap supply wheel 54a and a cap receiving wheel 54b by a sterilizing cap conveyance path 54 and screwed onto the mouth portion 1a of the bottle 2 by an unshown capper, to thereby seal the bottle 2.

The sealed bottle 2 is delivered from the gripper 22 of the sealing wheel 45 to the gripper 22 of a discharge wheel 48 of the discharge portion 47. The bottle 2 that was delivered to the discharge wheel 48 is placed onto the discharging conveyor 50. The bottle 2 placed on the discharging conveyor 50 is discharged to the outside of the aseptic filling machine from inside of the outlet portion chamber 50b.

The interiors of the bottle sterilizing portion chamber 33, the air-rinsing portion chamber 36, the filling portion chamber 41, the sealing portion chamber 46, the discharge portion chamber 49, and the outlet portion chamber 50b are sterilized before the operation of the aseptic filling machine. Thus, the sterilizer spraying nozzle 58 and a liquid spraying nozzle 59 are provided at each chamber as illustrated in FIG. 5.

A single-fluid spray or a twin-fluid spray in which a sterilizer and compressed air are mixed together and sprayed is used for the sterilizer spraying nozzle 58, and the sterilizer is sprayed so as to adhere to the entire area inside each of the chambers requiring sterilization. The interior of each of the chambers is sterilized by the sprayed sterilizer. The sterilizer spraying nozzle 58 is disposed so that the sterilizer adheres to the entire area inside each of the chambers. A sterilizer that is similar to the sterilizer used to sterilize the bottle 2 can be used, and use of a sterilizer containing peracetic acid or hydrogen peroxide is preferable. Spraying of the sterilizer may be performed by spraying multiple times using different kinds of sterilizer.

When peracetic acid is contained as the sterilizer, concentration of peracetic acid is set to 500 ppm or more or preferably to 1000 ppm or more. The sterilization condition in this case is that the sterilizer is heated to 50 to 95° C. or preferably to 60 to 95° C., and the sterilizer is sprayed to the inside of the chamber so that peracetic acid adheres to the surfaces of the apparatus and the wall of the chamber in 0.01 g/cm$^2$ or preferably 0.1 g/cm$^2$ or more. The spray time is preferably 30 seconds to 30 minutes. Spraying may be performed for 30 minutes or more but it lowers productivity.

After the sterilizer is sprayed from the sterilizer spraying nozzle 58, aseptic water is sprayed over the entire area inside each of the chambers by the liquid spraying nozzle 59. Sterilizer that remains inside of each of the chambers is cleaned away by the aseptic water. The liquid spraying nozzle 59 is disposed so that the liquid is sprayed over the entire area inside of each of the chambers. The aseptic water is water that is sterilized by being heated to 121.1° C. or higher for 4 minutes or more or by being passed through a sterilizing filter. Preferably, the aseptic water that is sprayed into each of the chambers from the liquid spraying nozzle 59 is heated to within a range of 60 to 100° C. For example, a spray nozzle that uses a spin ball is used as the liquid spraying nozzle 59. A configuration may also be adopted in which the liquid spraying nozzle 59 is not provided, and aseptic water is sprayed from the sterilizer spraying nozzle 58.

The aseptic water is sprayed to the inside of each the chambers after the sterilizer is sprayed, but if contents are diffused in the filling portion chamber 41, the sealing portion chamber 46, the discharge portion chamber 49, and the outlet portion chamber 50b before the sterilizer is sprayed, a cleaning liquid is sprayed from the liquid spraying nozzle 59, and the inside of each of the chambers is cleaned. The cleaning liquid is water or water containing acidic compound or basic compound. The water may be water or pure water sterilized by heating or filtering, ion exchanged water, distilled water or tap water. The acidic compounds include inorganic acid such as hydrochloric acid, nitric acid, phosphoric acid and the like or organic acid such as acetic acid, formic acid, octanoic acid, oxalic acid, citric acid, succinic acid, gluconic acid and the like. Further, basic compounds include inorganic basic compound such as sodium hydroxide, potassium hydroxide and the like or organic basic compound such as ethanol amine, diethyl amine and the like. Other than the above, alkali metal salt, alkaline earth metal salt, ammonium salt of organic acid, a sequestering agent such as ethylenediaminetetraacetic acid and the like, a non-ion surface active agent such as anion surface active agent, cation surface active agent, polyoxyethylene alkylphenylether and the like, a solubilizer such as sodium cumenesulfonic acid and the like, an acidic polymer such as polyacrylic acid and the like or their metal salt, a corrosion inhibitor, preservatives, oxidation inhibitor, a dispersing agent, an antifoaming agent and the like may be contained. Further, since these cleaning liquids have a sterilization action when they are heated to 50° C. or higher, they may be used as a sterilizer for sterilizing the inside of the chambers.

In each of the chambers, as illustrated in FIG. 5, an aseptic air supplying apparatus 60 is provided. The aseptic air supplying apparatus 60 is connected to an upper portion of each of the chambers. The aseptic air supplying apparatus 60 includes a blower 61, a heating apparatus 62 and an aseptic filter 63. Air from the blower 61 is heated by the heating apparatus 62, and the heated air is sterilized by the aseptic filter 63, and thereafter is supplied as aseptic air into each of the chambers. As illustrated in FIG. 5, the aseptic filter 63 is provided perpendicularly to the top surface of the chamber for preventing the cleaning liquid and the sterilizer from adhering to the surface of the aseptic filter 63. The sterilizing filter 63 may be provided in parallel with the chamber surface.

Further, an exhaust apparatus 64 is provided in each of the chambers and keeps the pressure in each of the chambers at a proper value in conjunction with the aseptic air supplying apparatus 60.

Aseptic water that was sprayed from the liquid spraying nozzle 59 and remains in each of the chambers is vaporized and removed by the aseptic air that is supplied from the aseptic air supplying apparatus 60. At this time, by heating the aseptic air, removal of the aseptic water by vaporization is swiftly performed. Further, the aseptic air supplying apparatus 60 supplies aseptic air into each of the chambers in order to maintain the aseptic condition inside each of the chambers during operation of the aseptic filling machine. In this case, it is not necessary for the aseptic air to be heated.

When performing sterilization prior to operation of the aseptic filling machine, the surface of the aseptic filter 63 can also be sterilized by spraying the sterilizer by means of the sterilizer spraying nozzle 58. Sterilization of the surface of the aseptic filter 63 may be performed by sterilizing using a gas, a mist or a mixture of gas and mist of a hydrogen peroxide solution.

The order as well as the number of times for performing spraying of a sterilizer, spraying of aseptic water and supply of aseptic air can be arbitrarily set, and any order and number of times may be adopted as long as the conditions adopted are such that the interior of each of the chambers is sterilized.

A trouble occurs in any of the portions during the operation of the aseptic filling machine. The trouble is a case in which the bottle 2 or the cap 3 is bitten by each of the wheels or the gripper 22 and cannot be conveyed anymore, for example. Further, there can be such a case in which a large number of bottles 2 falls in each of the chambers due to defective conveyance, and conveyance cannot be resumed without removing the bottles 2. Further, the bottle 2 or the cap 3 used in the previous manufacture was not recovered and found after the insides of the chambers are sterilized, and sterilization should be performed again in some cases. Further, a glove installed in each of the chambers is broken and needs to be replaced in some cases.

When such trouble occurs, the operation of the aseptic filling machine is stopped, but the operation of the aseptic air supplying apparatus is continued in the trouble non-occurrence chamber, and the internal pressures of the trouble non-occurrence chambers are kept positive. In that case, the pressure in the trouble non-occurrence chamber is preferably made higher than the pressure of the aseptic filling machine in operation. As a result, when the door of the trouble occurrence chamber is opened, and the chamber is brought to a non-aseptic atmosphere, inflow of bacteria and the like into the trouble non-occurrence chamber from the opening portion of the trouble non-occurrence chamber can be further suppressed. Particularly, the pressure in the trouble non-occurrence chamber adjacent to the trouble occurrence chamber is preferably made higher than the pressure of the aseptic filling machine in operation. Therefore, the aseptic air supplying apparatus 60 in each of the chambers preferably has a capacity of having the pressure in each chamber at 30 Pa or more or preferably at 50 Pa or more. After that, the door of the chamber shielding the portion where the trouble occurred is opened, the inside of the trouble occurrence chamber is brought to the non-aseptic atmosphere, and the trouble is removed.

Before the door of the trouble occurrence chamber is opened, the opening portion of the trouble non-occurrence chamber is preferably closed to such a degree that the opening portion is not brought into contact with the device present at the opening portion. The devices present at the opening portion include the gripper 22 and a holding member that holds this or in the case of the cap sterilizing portion 52, it is a cap conveying member that introduces the cap 3 into the cap sterilizing portion 52, or in the case of the outlet portion 50a that discharges a product, it is a discharging conveyor 50. In order to close the opening portion, a cap inlet shutter 53 not in contact with the cap conveying member and a discharging conveyor shutter 51 not in contact with the discharging conveyor 50 are provided as closing members that are not in contact with the gripper 22. By closing the opening portion, when the door of the trouble occurrence chamber is opened, and the chamber is brought to the non-aseptic atmosphere, inflow of the bacteria and the like from the opening portion can be further suppressed.

After the trouble in the trouble occurrence chamber is removed, the opened door is closed. After that, the operations of cleaning and sterilizing similar to those before the operation of the aseptic filling machine are performed for the trouble occurrence chamber. First, cleaning is performed as necessary, and the sterilizer is sprayed into the chamber from the sterilizer spraying nozzle 58 and then, the aseptic water is sprayed by the liquid spraying nozzle 59. Further, the heated aseptic air is supplied into the chamber by the aseptic air supplying apparatus 60, and the inside of the chamber is dried. During this time, the pressure in the trouble non-occurrence chamber is kept positive by the supply of the aseptic air.

If a possibility of inflow of bacteria and the like through the opening portion from the trouble occurrence chamber into the trouble non-occurrence chamber adjacent to the chamber is assumed, the operations similar to those before the operation of the aseptic filling machine are preferably performed also for the trouble non-occurrence chamber adjacent to the trouble occurrence chamber. That is, the inside of the trouble non-occurrence chamber adjacent to the trouble occurrence chamber is also sterilized preferably.

Conventionally, when the door of the trouble occurrence chamber is opened, even if the trouble occurrence chamber is not the filling portion chamber 41, all the chambers are made non-aseptic atmosphere and thus, cleaning (CIP) and sterilization (SIP) in the filling valve of the filling portion 39 needed to be performed. According to the present invention, if the trouble occurrence chamber is not the filling portion chamber 41, since the inside of the filling portion chamber 41 is maintained in the non-aseptic atmosphere after the door of the trouble occurrence chamber is opened until the operation of the aseptic filling machine is resumed, cleaning (CIP) and sterilization (SIP) in the filling valve do not have to be performed for the filling valves including the filling nozzle 42 of the filling portion 39.

Further, even if the trouble occurrence chamber is the filling portion chamber 41, by opening the door after the filling nozzle 42 is closed by a CIP cup or the like, mixing of bacteria and the like into a product liquid remaining in the filling valve can be prevented. By closing the filling nozzle 42 as described above, cleaning (CIP) and sterilization (SIP) in the filling valve do not have to be performed. Further, by closing the filling nozzle 42 and by cleaning and sterilizing the inside of the filling portion chamber 41, mixing of the cleaning liquid and the sterilizer into the product liquid remaining in the filling valve can be prevented. If a trouble occurs in the filling portion chamber 41, after the occurrence of the trouble until the operation of the aseptic filling machine is resumed, it is preferable that the filling nozzle 42 is closed, and a product liquid storage tank is pressurized by the aseptic air, whereby the inside of a product liquid supply pipeline is maintained in a positive pressure state. By means of this measure, the inflow of bacteria and the like from the filling nozzle 42 can be further suppressed.

After the operation similar to that before the operation of the aseptic filling machine is finished for the trouble occurrence chamber, if the pressure in each of the chambers has been raised, the pressure in each of the chambers is set to a pressure suitable for the operation of the aseptic filling machine, and the operation of the aseptic filling machine is resumed.

Second Embodiment

A second embodiment of the present invention is illustrated in FIG. 6. The first embodiment is the aseptic filling machine that sterilizes the bottle 2, but the second embodiment is an aseptic filling machine that sterilizes the preform 1. The aseptic filling machine including a preform sterilizing portion 65 that sterilizes the preform 1 will be described below.

Outline of Second Embodiment

As illustrated in FIG. 6, the aseptic filling machine according to the second embodiment includes the preform supplying apparatus 4 that supplies the preform 1; the preform sterilizing portion 65 that sterilizes the preform 1; the heating portion 6 that heats the preform 1 to a temperature at which the preform 1 is molded into the bottle 2; the molding portion 16 that molds the heated preform 1 into the bottle 2; an inspecting portion 70 that inspects the molded bottle 2; the filling portion 39 that fills sterilized content into the bottle 2 that was determined to be normal by inspection; the cap sterilizing portion 52 that sterilizes the cap 3 which is the sealing member, the sealing portion 44 that seals the bottle 2 filled with the content with the sterilized cap 3; the discharge portion 47 that places the sealed bottle 2 on the discharging conveyor 50; and the outlet portion 50a that discharges the bottle 2 into a non-aseptic zone by the discharging conveyor 50. The inspecting portion 70 does not have to be provided.

The preform sterilizing portion 65 is shielded by a preform sterilizing portion chamber 66, the heating portion 6 is shielded by the heating portion chamber 12, the molding portion 16 is shielded by the molding portion chamber 17, the inspecting portion 70 is shielded by an inspecting portion chamber 71, the filling portion 39 is shielded by the filling portion chamber 41, the sealing portion 44 is shielded by the filling portion chamber 46, the discharge portion 47 is shielded by the discharge portion chamber 49, and the outlet portion 50a is shielded by an outlet portion chamber 50b, respectively. Unlike the first embodiment, the molding portion 16 and the inspecting portion 70 are not in the same chamber but by shielded by the molding portion chamber 17 and the inspecting portion chamber 71, respectively. Here, the cap sterilizing portion 52 and the sealing portion 44 may be shielded by a single chamber. Further, the sealing portion 44 and the discharge portion 47 may also shielded by a single chamber.

The aseptic air sterilized by the aseptic filter during the operation of the aseptic filling machine is supplied to the heating portion chamber 12, the molding portion chamber 17, the inspecting portion chamber 71, the filling portion chamber 41, the sealing chamber 46, the discharge portion chamber 49, and the outlet portion chamber 50b so as to make the pressure in each of the chambers positive, whereby the aseptic condition of the aseptic filling machine is maintained. The pressure to make positive is the highest in the filling portion chamber 41 and is set lower as it goes to the upstream or the downstream. Assuming that the pressure in the filling portion chamber 41 is 20 to 40 Pa, for example, the pressures in the other chambers are lower than the pressure in the filling portion chamber 41.

To the preform sterilizing portion chamber 66, an exhaust device composed of a filter 68 that decomposes the sterilizer in the air in the preform sterilizing portion chamber 66 and the blower 69 is connected. By exhausting the air in the preform sterilizing portion chamber 66 during the operation of the aseptic filling machine, the inflow of the sterilizer to the adjacent heating portion 6 can be prevented. Therefore, the pressure in the preform sterilizing portion chamber 66 is substantially equal to the atmospheric pressure during the operation of the aseptic filling machine.

If the aseptic condition in each of the chambers is maintained during the operation of the aseptic filling machine, the pressure in each of the chambers may be low. However, if a trouble occurs in a portion in any one of the chambers, the inside of the trouble occurrence chamber needs to be in the non-aseptic atmosphere, but the pressure in the trouble non-occurrence chamber needs to be kept positive in order to maintain the aseptic condition in the trouble non-occurrence chamber. The pressure in the trouble non-occurrence chamber is preferably 30 Pa or more or more preferably 50 Pa or more. By making it higher than the pressure in each of the chambers during the operation of the aseptic filling machine, even if the inside of the trouble occurrence chamber is made the non-aseptic atmosphere during stop of the aseptic filling machine, the inside of the trouble non-occurrence chamber can be maintained in the aseptic atmosphere. Therefore, the aseptic air supplying apparatus that can hold the pressures in the heating portion chamber 12, the molding portion chamber 17, the inspecting portion chamber 71, the filling portion chamber 41, the sealing portion chamber 46, the discharge portion chamber 49, and the outlet portion chamber 50b which need to maintain the aseptic atmosphere during the operation of the aseptic filling machine preferably at 30 Pa or more or more preferably at 50 Pa or more is provided.

Details of Second Embodiment

The preforms 1 are conveyed by the preform supplying apparatus 4 shown in FIG. 6 to the preform sterilizing portion 65 consecutively at a desired speed by the preform supplying conveyor 5. The preform 1 is similar to that in the first embodiment.

The preform 1 is gripped by the grippers 22 provided at regular intervals from the preform supplying conveyor 5 to the wheel 7, and gas or mist of the sterilizer or a mixture thereof is blasted by a preform sterilizer gas blasting nozzle 67 provided on the wheel 7 as shown in FIG. 7(I).

As shown in FIG. 7(I), this gas of the sterilizer flows in two directions in the preform sterilizer gas blasting nozzle 67, is blasted toward the inside of the preform 1 from one nozzle 67a, and is blasted toward an outer surface of the preform 1 from the other nozzle 67b. The sterilizer gas flows into the preform 1 still in a gas state or as a mist or a mixture thereof after existing from the preform sterilizer gas blasting nozzle 67 or is brought into contact with the outer surface of the preform 1.

The gas of the sterilizer or mist or the mixture thereof blasted toward the inside of the preform 1 flows into the preform 1 and then, overflows from the mouth portion 1a of the preform 1, and a flow the overflowing sterilizer gas or mist or the mixture thereof collides against a guide member 77, is led to an inner surface of the guide member 77, changes its flow toward the outer surface of the preform 1 and is brought into contact with the outer surface of the preform 1. By providing an annular groove 77a in the guide member 77, the overflowing sterilizer gas or mist or the mixture thereof flows along the outer surface of the preform 1.

Since the sterilizer gas or mist or the mixture thereof is brought into contact with the inner/outer surface of the preform 1 and adheres thereto as described above, bacteria and the like adhering to the surface of the preform 1 are sterilized.

A configuration may also be adopted in which not only one but a plurality of preform sterilizer gas blasting nozzles 67 shown in FIG. 7(I) is disposed along the traveling path of the preform 1 so that the sterilizer gas or mist or the mixture thereof is blasted toward the preform 1 from these preform sterilizer gas blasting nozzles 67. Further, by changing a diameter of the preform sterilizer gas blasting nozzle 67, the nozzle 67a or the nozzle 67b or the diameter and the number of sterilizer gas blasting ports provided in the nozzle 67b, an adhesion amount of the sterilizer to the inner surface and the outer surface of the preform 1 can be adjusted, respectively.

A configuration may also be adopted in which normal-temperature or heated aseptic air is supplied to the preform sterilizer gas blasting nozzle 67, the nozzle 67a, and the nozzle 67b from the middle of them, and the sterilizer gas diluted by the aseptic air or mist or the mixture thereof is blasted to the preform 1.

The preform 1 may be preliminarily heated by blasting hot air to the preform 1 immediately before blasting of the sterilizer gas to the preform 1 shown in FIG. 7(I). The sterilization effect of the preform 1 can be further improved by this preliminary heating.

The sterilizer similar to that in the first embodiment is used. Further, the sterilizer is gasified by the sterilizer gas generator 55 similar to that in the first embodiment. The blasting amount of the sterilizer gas is arbitrary but if the sterilizer is a hydrogen peroxide solution, the adhesion amount of hydrogen peroxide to the preform 1 is preferably 0.001 to 0.5 µL/cm$^2$ as an amount of the hydrogen peroxide solution containing 35% by mass of hydrogen peroxide. If the adhesion amount is smaller than 0.001 µL/cm$^2$, a sufficient sterilization effect cannot be gained. Further, if the adhesion amount exceeds 0.5 µL/cm$^2$, when the preform 1 is blow-molded into the bottle 2, defective molding such as whitening, spots, wrinkles or deformation occurs in the bottle 2 or a residual amount of hydrogen peroxide in the bottle 2 increases.

A configuration may also be adopted in which the preform 1 to which the sterilizer gas was blasted is gripped by the gripper 22 as shown in FIG. 7(J) and while it is conveyed, the aseptic air is blasted by the air blasting nozzle 78. The blasting of the aseptic air does not have to be performed depending on the type or amount of the sterilizer.

The sterilizer adhering to the surface of the preform 1 is activated by blasting of the aseptic air, and bacteria and the like on the inner/outer surface of the preform 1 are sterilized. Further, the sterilizer adhering to the preform 1 is swiftly removed from the surface of the preform 1 by blasting of the aseptic air. The sterilizer adhering to the preform 1 is removed from the preform 1 by blasting of the aseptic air before being heated. Further, contaminants in the preform 1 are also removed by blasting of the aseptic air to the preform 1.

The aseptic air may be at a normal temperature but by heating it to have hot aseptic air, the sterilization effect is improved, and if the sterilizer contains hydrogen peroxide, residues of hydrogen peroxide on the preform 1 also decreases. The heating of the aseptic air is preferably such that a temperature of the hot aseptic air blasted to the preform 1 is 40 to 140° C. If it is less than 40° C., the effect by heating is small, while if the temperature of the preform 1 exceeds 70° C., nonconformity such as deformation of the mouth portion 1a of the preform 1 occurs and thus, the temperature of the hot aseptic air does not preferably exceed 140° C.

As shown in FIG. 7(J), the aseptic air is blown out of a slit-shaped blow-out port 78a formed in a box-shaped manifold 78b mainly constituting the air blasting nozzle 78. Further, a configuration may also be adopted in which the air blasting nozzle 78 is made to follow the preform 1, and the aseptic air is blasted to the preform 1. Furthermore, a configuration may also be adopted in which the air blasting nozzle 78 is made to be rod-like and is inserted into the preform 1 so as to perform blasting of aseptic air into the preform 1 as well as removal of contaminants in the preform 1.

The blasting of the sterilizer gas to the preform 1 shown in FIG. 7(I) is performed by the preform sterilizer gas blasting nozzle 67 provided on the wheel 7 as shown in FIG. 6, and the blasting of the aseptic air to the preform 1 shown in FIG. 7(J) is performed by the air blasting nozzle 78 provided on the wheel 8 as shown in FIG. 6. However, either of the steps may be performed by the wheel 7 or the wheel 8.

The preform 1 supplied to the heating portion 6 reaches a heating portion conveyance wheel 9 shown in FIG. 6. After that, the heating step of the preform 1 is similar to that in the first embodiment. The heated preform 1 is conveyed to the molding portion 16 via the wheel 15 as shown in FIG. 6. A preform tunnel 79 surrounding the conveyance path of the preform 1 is provided on the conveyance path in the wheel 15 as shown in FIG. 6. The preform tunnel 79 covers the mouth portion 1a of the preform 1 from above, and a ceiling portion is formed like a roof having an inclined surface. Further, nozzles that blast aseptic air toward the mouth portion 1a of the preform 1 are provided on the ceiling portion in a pipe row state or a slit state. As a result, the aseptic air is efficiently supplied to the preform 1, and the preform 1 is delivered to the molding wheel 18 of the molding portion 16 while the aseptic condition is maintained.

The molding step of the preform 1 that was delivered to the molding wheel 18 is similar to that in the first embodiment.

The molded bottle 2 is conveyed to the inspecting portion 70 via the wheel 23, and a bottle tunnel 80 surrounding a conveyance path of the bottle 2 is provided on the conveyance path in the wheel 23 as shown in FIG. 6. The bottle tunnel 80 covers the mouth portion 1a of the bottle 2 from above, and a ceiling portion is formed like a roof having an inclined surface. Further, nozzles that blast aseptic air toward the mouth portion 1a of the bottle 2 are provided on the ceiling portion in a pipe row state or a slit state. As a result, the aseptic air is efficiently supplied to the bottle 2, and the bottle 2 can travel in the molding portion chamber 17 while the aseptic condition is maintained.

The bottle 2 is delivered to an inspection wheel 72 of the inspecting portion 70 via the wheel 23. Only the bottles 2 that are confirmed to be free of defects in the inspection are further conveyed to the filling portion 39. The bottle 2 is preferably inspected in the inspecting portion 70 so that an improper product is not produced by using an abnormal bottle 2 caused by defective molding or the like. If abnormality is found by the inspection, the bottle is discharged to the outside of the aseptic filling machine by a discharging apparatus 74 of the defective bottle shown in FIG. 6. The inspection machine 24 that inspects the bottle 2 is provided along the inspection wheels 72 and 73 of the inspecting portion.

The inside of the inspecting portion chamber 71 is sterilized before the operation, aseptic air is supplied during the operation, and the aseptic atmosphere is maintained. In sterilization before the operation of the aseptic filling machine, the inspection machine 24 is accommodated in a sealed container so that the inspection machine 24 that inspects the bottle 2 is not in contact with the sterilizer. It is for preventing the inspection machine 24 from being brought into contact with the sterilizer and causes corrosion or the like. That is, the inspecting portion 70 includes the inspection machine 24 accommodated in the sealed container. The inspecting items and the step of inspection are similar to those in the first embodiment, but since the bottle 2 has been already sterilized, temperature measurement does not have to be conducted.

The bottle 2 determined to be abnormal by the inspection is discharged to the outside of the aseptic filling machine by the discharging apparatus 74 provided on the discharge wheel 75, while the bottle 2 determined to be normal is conveyed to the filling portion 39 via the wheel 76. The steps in the filling portion 39, the sealing portion 44, and the discharge portion 47 are similar to those in the first embodiment.

Before the operation of the aseptic filling machine, the insides of the heating portion chamber 12 and the molding portion chamber 17 are sterilized. For example, as one of sterilizing methods, the insides of the heating portion chamber 12 and the molding portion chamber 17 are gas-sterilized by air containing hydrogen peroxide at a concentration of 20 mg/L or less. In this case, the sterilizer spraying nozzle 58 as shown in FIG. 5 is provided in the heating portion chamber 12 and the molding portion chamber 17 similarly to the first embodiment. Further, a portion in contact with the preform 1 and the bottle 2 may be irradiated with a UV lamp (ultraviolet-ray sterilization). Further, a configuration may also be adopted in which a liquid-state sterilizer is introduced into the preform 1 by a method such as dripping or the like, air or the like is blasted into the preform 1 from the blow nozzle 21 in a state where the sterilizer still remains inside the preform 1 so as to diffuse the sterilizer in the molding portion chamber 17 and to sterilize the inside of the molding portion chamber 17.

In order to maintain the aseptic condition in the heating portion chamber 12 and the molding portion chamber 17 during the operation of the aseptic filling machine, the aseptic air is supplied into the heating portion chamber 12 and the molding portion chamber 17. Similarly to the first embodiment, the heating portion chamber 12 and the molding portion chamber 17 include the aseptic air supplying apparatus 60. Further, if a trouble occurs in any of portions in the aseptic filling machine, in order to maintain the aseptic condition in the heating portion chamber 12 and the molding portion chamber 17 while the trouble is removed, the aseptic air supplying apparatus 60 has capacity to hold the pressures in the heating portion chamber 12 and the molding portion chamber 17 preferably at 30 Pa or more or more preferably at 50 Pa or more. Further, the exhaust apparatus 64 is also provided, and the pressures in the heating portion chamber 12 and the molding portion chamber during the operation of the aseptic filling machine may be kept proper by a balance of the operation conditions of the aseptic air supplying apparatus 60 and the exhaust apparatus 64.

The inspecting portion chamber 71 includes the sterilizer spraying nozzle 58, the liquid spraying nozzle 59, and the aseptic air supplying apparatus 60 similarly to the first embodiment shown in FIG. 5. The aseptic air supplying apparatus 60 also includes a capacity of holding the pressure in the inspecting portion chamber 71 preferably at 30 Pa or more or more preferably at 50 Pa or more. The sterilization in the inspecting portion chamber 71 before the operation of the filling machine is performed similarly to that in each of the chambers in the first embodiment.

Cleaning and sterilization in the filling portion chamber 41, the sealing portion chamber 46, the discharge portion chamber 49, and the outlet portion chamber 50b are similar to those in the first embodiment.

A trouble can occur in the heating portion chamber 12, the molding portion chamber 17, the inspecting portion chamber 71, the filling portion chamber 41, the sealing portion chamber 46, the discharge portion chamber 49, and the outlet portion chamber 50b during the operation of the aseptic filling machine. The trouble is a case in which the preform 1 or the bottle 2 is bitten by each of the wheels or the gripper 22 and cannot be conveyed anymore, for example. Further, a large number of bottles 2 fall into each of the chambers due to defective conveyance, and the conveyance cannot be resumed without removing the bottle 2 in some cases. Further, the preform 1 or the bottle 2 used in the previous manufacture was not recovered and found after the insides of the chambers are sterilized, and sterilization should be performed again in some cases. Further, a glove installed in each of the chambers is broken and needs to be replaced in some cases.

When such trouble occurs, the operation of the aseptic filling machine is stopped, but the operation of the aseptic air supplying apparatus 60 is continued in the trouble non-occurrence chamber, and the internal pressures of the trouble non-occurrence chambers are kept positive. In that case, the pressure in the trouble non-occurrence chamber is preferably made higher than the pressure of the aseptic filling machine in operation. As a result, when the door of the trouble occurrence chamber is opened, and the inside of the chamber is brought to a non-aseptic atmosphere, inflow of bacteria and the like from the opening portion can be further suppressed. Particularly, the pressure in the trouble non-occurrence chamber adjacent to the trouble occurrence chamber is preferably made higher than the pressure of the aseptic filling machine in operation. Therefore, the aseptic air supplying apparatus 60 in each of the chambers preferably has a capacity of making the pressure in each chamber positive preferably at 30 Pa or more or more preferably at 50 Pa or more. After that, the door of the trouble occurrence chamber is opened, the inside of the trouble occurrence chamber is brought to the non-aseptic atmosphere, and the trouble is removed.

The operation in which the trouble is removed after occurrence of the trouble and the operation of the aseptic filling machine is resumed is similar to that in the first embodiment. The opened door is closed, and the operation similar to that before the operation of the aseptic filling machine is performed. First, if the trouble occurrence chamber is any one of the filling portion chamber 41, the sealing portion chamber 46, the discharge portion chamber 49, and the outlet portion chamber 50b, cleaning according to need is performed, the sterilizer is sprayed into the chamber from the sterilizer spraying nozzle 58 and then, the aseptic water is sprayed from the liquid spraying nozzle 59. Further, the heated aseptic air is supplied into the chamber by the aseptic air supplying apparatus 60 so as to dry the inside of the chamber. If the trouble occurrence chamber is any one of the heating portion chamber 12, the molding portion chamber 17, and the inspecting portion chamber 71, there is no need to perform cleaning. Sterilization suitable for each of the chambers is performed.

After the operation similar to that before the operation of the aseptic filling machine is finished for the chamber in which the trouble occurred, the pressure in each of the chambers is set to numeral values suitable for the operation of the aseptic filling machine, and the operation of the aseptic filling machine is resumed.

The present invention is configured as described above. However, the present invention is not limited to the embodiments described above, and various modifications can be made without departing from the spirit of the present invention.

REFERENCE SIGNS LIST 1 preform
2 bottle
12 heating portion chamber
17 molding portion chamber
33 bottle sterilizing portion chamber
41 filling portion chamber
46 sealing portion chamber
49 discharge portion chamber
60 aseptic air supplying apparatus
66 preform sterilizing portion chamber
71 inspecting portion chamber

The invention claimed is:

1. A trouble recovering method of an aseptic filling machine that fills a sterilized content into a sterilized bottle in an aseptic atmosphere and seals the bottle with a sterilized sealing member, the aseptic filling machine having a chamber that shields a heating portion that heats a preform, a molding portion that molds the heated preform into the bottle, a bottle sterilizing portion that sterilizes the bottle, a filling portion that fills sterilized content into the bottle, a sealing portion that seals the bottle filled with the content and a discharge portion that places the sealed bottle on a discharging conveyor constituting the aseptic filling machine, wherein:

when a trouble occurs in any of the portions, an operation of the aseptic filling machine is stopped, and in a state where an internal pressure of a trouble non-occurrence chamber which is the chamber that shields the portion in which the trouble does not occur is made a positive pressure by supply of an aseptic air, a door of a trouble occurrence chamber that shields the portion in which the trouble occurred is opened, the trouble is removed and then, the door of the trouble occurrence chamber is closed and the inside of the trouble occurrence chamber is sterilized and then, the operation of the aseptic filling machine is resumed, wherein if the trouble occurrence chamber is the chamber that shields the filling portion, the sealing portion and the discharge portion, a cleaning of the trouble occurrence chamber is performed, a sterilizer is sprayed into the trouble occurrence chamber, an aseptic water is sprayed and a heated aseptic air is supplied into the trouble occurrence chamber.

2. The trouble recovering method of an aseptic filling machine according to claim 1, wherein the portion is any of a preform sterilizing portion that sterilizes a preform, the heating portion that heats the preform to a molding temperature, the molding portion that molds the heated preform into a bottle, the bottle sterilizing portion that sterilizes the molded bottle, the filling portion that fills a content into the molded bottle, a sealing member sterilizing portion that sterilizes a sealing member, the sealing portion that seals the bottle filled with the content, and the discharge portion that discharges the sealed bottle.

3. The trouble recovering method of an aseptic filling machine according to claim 2, wherein an opening portion is closed to such a degree that the opening portion is not bought into contact with equipment present at the opening portion of the trouble occurrence chamber and then, the door of the trouble occurrence chamber is opened.

4. The trouble recovering method of an aseptic filling machine according to claim 2, wherein the inside of the trouble non-occurrence chamber adjacent to the trouble occurrence chamber is sterilized during a period from start of sterilization of the inside of the trouble occurrence chamber until the operation of the aseptic filing machine is resumed.

5. The trouble recovering method of an aseptic filling machine according to claim 2, wherein CIP (Cleaning in Place) or SIP (Sterilization in Place) of a filling valve is not performed after opening of the door of the trouble occurrence chamber until the operation of the aseptic filling machine is resumed.

6. The trouble recovering method of an aseptic filling machine according to claim 1, wherein an opening portion is closed to such a degree that the opening portion is not brought into contact with equipment present at the opening portion of the trouble occurrence chamber and then, the door of the trouble occurrence chamber is opened.

7. The trouble recovering method of an aseptic filling machine according to claim 6, wherein the inside of the trouble non-occurrence chamber adjacent to the trouble occurrence chamber is sterilized during a period from start of sterilization of the inside of the trouble occurrence chamber until the operation of the aseptic filling machine is resumed.

8. The trouble recovering method of an aseptic filling machine according to claim 6, wherein CIP (Cleaning in Place) or SIP (Sterilization in Place) of a filling valve is not performed after opening of the door of the trouble occurrence chamber until the operation of the aseptic filling machine is resumed.

9. The trouble recovering method of an aseptic filling machine according to claim 1, wherein the inside of the trouble non-occurrence chamber adjacent to the trouble occurrence chamber is sterilized during a period from start of sterilization of the inside of the trouble occurrence chamber until the operation of the aseptic filling machine is resumed.

10. The trouble recovering method of an aseptic filling machine according to claim 9, wherein CIP (Cleaning in Place) or SIP (Sterilization in Place) of a filling valve is not performed after opening of the door of the trouble occurrence chamber until the operation of the aseptic filling machine is resumed.

11. The trouble recovering method of an aseptic filling machine according to claim 1, wherein CIP (Cleaning in Place) or SIP (Sterilization in Place) of a filling valve is not performed after opening of the door of the trouble occurrence chamber until the operation of the aseptic filling machine is resumed.

12. The trouble recovering method of an aseptic filling machine according to claim 11, wherein if the trouble occurrence chamber is the filling portion chamber that shields the filling portion, a filling port of the filling valve is closed and then, cleaning and sterilization of the inside of the filling portion chamber is performed.

13. An aseptic filling machine that fills a sterilized content into a sterilized bottle in an aseptic atmosphere and seals the bottle with a sterilized sealing member, the aseptic filling machine comprising:

a chamber that shields a heating portion that heats a preform, a molding portion that molds the heated preform into the bottle, a bottle sterilizing portion that sterilizes the bottle, a filling portion that fills sterilized content into the bottle, a sealing portion that seals the bottle filled with the content and a discharge portion that places the sealed bottle on a discharging conveyor constituting the aseptic filling machine, a door that is opened of a trouble occurrence chamber that shields a portion in which a trouble occurred and is closed after the trouble is removed, and an aseptic air supplying apparatus that keeps a positive pressure in a trouble non-occurrence chamber which shields a portion in which the trouble does not occur, wherein if the trouble occurrence chamber is the chamber that shields the filling portion, the sealing portion and the discharge portion, a leaning of the trouble occurrence chamber is performed, a sterilizer is sprayed into the trouble occurrence chamber, an aseptic water is sprayed and a heated aseptic air is supplied into the trouble occurrence chamber.

14. The aseptic filling machine according to claim 13, wherein the aseptic filling machine has an opening-portion closing device that, if equipment is present at an opening portion provided in the chamber, closes the opening portion to such a degree that the opening portion is not brought into contact with the equipment, while if the equipment is not present, closes the entire surface of the opening portion.

* * * * *